United States Patent [19]

Blake

[11] Patent Number: 5,207,063
[45] Date of Patent: May 4, 1993

[54] TURBOCHARGER SYSTEM FOR INTERNAL COMBUSTION ENGINE AND METHOD OF OPERATION

[75] Inventor: James E. Blake, Rancho Palos Verdes, Calif.

[73] Assignee: AlliedSignal Inc., Morristown, N.J.

[21] Appl. No.: 780,679

[22] Filed: Oct. 21, 1991

[51] Int. Cl.⁵ ............................................. F02B 37/00
[52] U.S. Cl. ...................................................... 60/612
[58] Field of Search ............... 60/605.1, 612; 123/562, 123/559.1

[56] References Cited

U.S. PATENT DOCUMENTS 2,877,622  3/1959  Antonissen .................. 60/612 X
4,766,729  8/1988  Miyajima ................. 123/559.1 X

FOREIGN PATENT DOCUMENTS 1003505  2/1957  Fed. Rep. of Germany ........ 60/612

Primary Examiner—Michael Koczo
Attorney, Agent, or Firm—Ken C. Decker; William N. Antonis

[57] ABSTRACT

A method and apparatus for providing charge air to the intake manifold of an internal combustion engine at high pressure levels at low engine speeds without compressor surge provides an auxiliary turbocharger which receives a portion of the compressed air produced by a main turbocharger at low exhaust gas flow conditions. The remainder of the compressed air generated by the turbocharger under such low exhaust gas flow conditions is communicated through the compressor section of the auxiliary turbocharger, where the pressure of the compressed air is further increased to a level sufficient to provide charge air at an adequate pressure level to the intake manifold of an internal combustion engine to permit efficient operation of the engine with minimal emissions at low engine speeds. An alternate embodiment of the invention provides a control that directs exhaust gas through the turbine of the auxiliary compressor at high engine speeds, so that the auxiliary compressor at such high engine speeds acts as a sequential compressor, further compressing the compressed air generated by the main turbocharger.

19 Claims, 2 Drawing Sheets

TURBOCHARGER SYSTEM FOR INTERNAL COMBUSTION ENGINE AND METHOD OF OPERATION

This invention relates to a turbocharging system for providing charge air to the intake manifold of an internal combustion engine.

Current diesel engines are equipped with turbochargers which are driven by the exhaust gases of the engine to charge the intake manifold of the engine with compressed air in order to increase the efficiency and Power output of the engine during normal operating conditions. However, existing turbochargers are ineffective at low exhaust flows, which normally occur at low engine speed. This has not been a problem in the past because required torque from the engine at low engine speeds ("low end torque") has been small. Accordingly, turbocharger compressors have been designed to operate at maximum efficiency at higher engine speeds.

However, current market requirements for turbocharged commercial diesel engines require higher low end torque than in the past. Accordingly, high intake manifold pressure at low engine speeds is required, so turbochargers must be operable at very low flows and still supply the required pressure level to the intake manifold. However, compressors designed for maximum efficiency at higher engine speeds are inefficient at lower engine speeds, and if the required pressure increase from such a compressor is attempted, the compressor often must operate in the so-called "surge" region. Surge is a phenomena exhibited by centrifugal compressors of the type used in turbochargers in which the compressor becomes unstable at low compressor speeds and high boost pressures. Such instability may result in the destruction of the turbocharger, so operation in the surge region must be avoided. Furthermore, proposed governmental emissions requirements for diesel engines require high intake manifold pressure at low engine speed in order to minimize particulate emissions.

Previous attempts at solving the problem of providing the required intake manifold pressure at low engine speeds have focused upon designing relatively wide flow range compressors. While such wide flow range compressors necessarily sacrifice maximum efficiency in the normal operating range of the compressor, even wide flow range compressors may not provide sufficient range to provide the required intake manifold pressure at low engine speed without entering the surge region. Another attempt to solve the problem is to provide a recirculation device which recirculates some of the output of the compressor from the outlet to the intake at low compressor speeds, but recirculation devices are undesirable for a number of reasons and results in a self-feeding temperature rise phenomena. Air compression necessarily results in increasing the temperature of the air, and if compressed air from the outlet is fed back to the inlet, the already high temperature of the air at the outlet is further increased in temperature as it is again fed through the compressor.

The problem is solved by the present invention by providing a relatively small, inexpensive, auxiliary turbocharger in addition to the main turbocharger. At low exhaust flow conditions, a portion of the output of the main turbocharger is circulated to the turbine section of the auxiliary turbocharger, and then discharged to atmosphere, so that the self-feeding temperature rise phenomena is avoided. The remainder of the main compressor output at low engine speeds is circulated to the intake of the compressor of the auxiliary turbocharger. The output of the compressor section of the auxiliary turbocharger is connected to the intake manifold. At higher exhaust flows, where the auxiliary turbocharger is not needed, all of the output of the compressor portion of the main turbocharger is communicated directly to the engine intake manifold, so that the auxiliary compressor is bypassed. Accordingly, the pressure of the compressed air is further increased by the auxiliary turbocharger, providing the required intake manifold pressure level.

These and other advantages of the present invention will become apparent from the following description, with reference to the accompanying drawings, in which.

Figure 1:
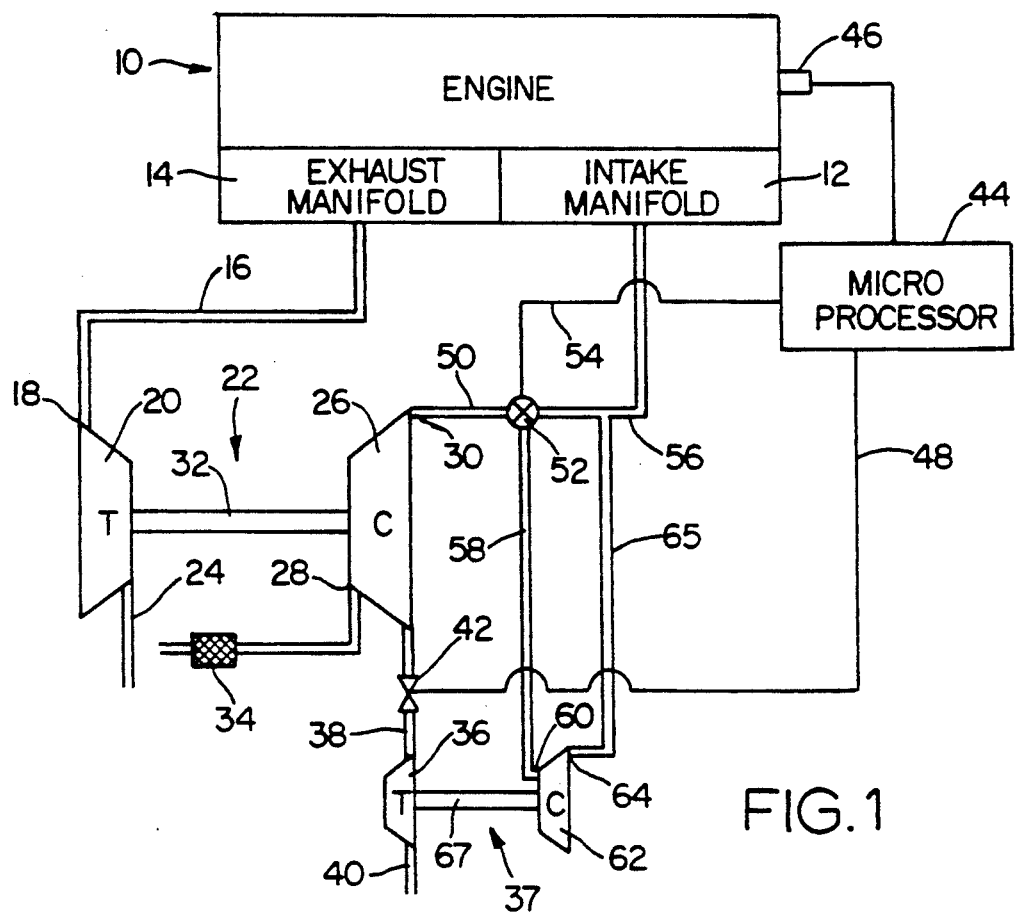
FIG. 1 is a line flow diagram of a turbocharger system made pursuant to the present invention.

Referring now to FIG. 1, a compression ignition or diesel engine generally indicated by the numeral 10 is equipped with an intake manifold 12 for receiving charge air for combustion and an exhaust manifold 14 through which exhaust gases are discharged from the engine 10. The exhaust manifold 14 is communicated through exhaust gas line 16 to the inlet side 18 of turbine portion 20 of the engine main turbocharger generally indicated by the numeral 22. Exhaust gases are discharged from the turbine portion 20 through vehicle exhaust system 24. Main turbocharger 22 further includes a compressor portion 26 which receives ambient air at intake 28 and discharges compressed air at discharge 30. The turbine portion 20 and compressor portion 26 which are illustrated schematically on FIG. 1 are implemented as a turbine wheel and a compressor wheel mounted on opposite ends of a shaft 32. Air communicated to the intake 28 is filtered by a conventional air filter 34.

According to the invention, a portion of the compressed air generated by the compressor portion 26 of the main turbocharger 22 is communicated to a turbine section 36 of an auxiliary turbocharger generally indicated by the numeral 37 through a pressure line 38. After passing through the turbine section 36 of auxiliary turbocharger 37, the air is discharged to atmosphere through discharge line 40.

An electrically controlled, normally closed, modulating valve 42 is installed in the line 38. The modulating valve 42 is controllable to communicate a predetermined portion of the compressed air generated by the compressor portion 26 to the auxiliary turbocharger 37. Instead of the normally closed modulating valve 42, the turbine section 34 may be a variable nozzle turbine, in which the flow through the turbine is modulated by, for example, pivoting vanes. During high speed operation of the main turbocharger 22, the vanes would be closed to shut off communication through the line 38, but, as will be hereinafter explained, during low speed operation, the vanes would be shifted to a position admitting only a portion of the compressed air generated by the compressor portion 26 to the turbine section 34.

The modulating valve 42, or the aforementioned vanes if a variable turbine is used, are controlled by a microprocessor generally indicated by the numeral 44. Microprocessor 44 receives an input from an engine speed sensor generally indicated by the numeral 46 and, when the speed of the engine drops below a predetermined level, generates a signal which is transmitted to modulating valve 42 over the line 48. If a variable nozzle turbine is used, the signal is transmitted to an actuator controlling the position of the vanes.

The portion of the compressed air generated by the compressor portion 26 that is not communicated to the turbine section 36 of turbocharger 37 is communicated through pressure line 50 to a two-position, electrically actuated valve 52. Valve 52 is also operated by an electrical signal generated by the microprocessor 44 in response to engine speed. During low engine speed conditions, the microprocessor 44, in addition to the signal transmitted through line 48, transmits a signal through line 54 actuating the valve 52 from a normal position in which compressed air is taken directly from the discharge 30 and fed to the intake manifold 12 through pressure line 56 to an actuated position in which the flow received from line 50 is directed into branch passage 58. Compressed air in passage 58 is received at intake 60 of a compressor section 62 of the auxiliary turbocharger 37. The pressure of the compressed air received at intake 60 is further increased by being passed through the compressor section 62 and is then discharged through discharge 64 into a branch line 66, which communicates the discharge 64 back into the pressure line 56 so that the compressed air is communicated to the intake manifold 12. As in the case of the main turbocharger 22, both the turbine section 36 and compressor section 62 consist of a turbine wheel and a compressor wheel which are mounted on the opposite ends of a shaft indicated diagrammatically at 67.

Figure 2:
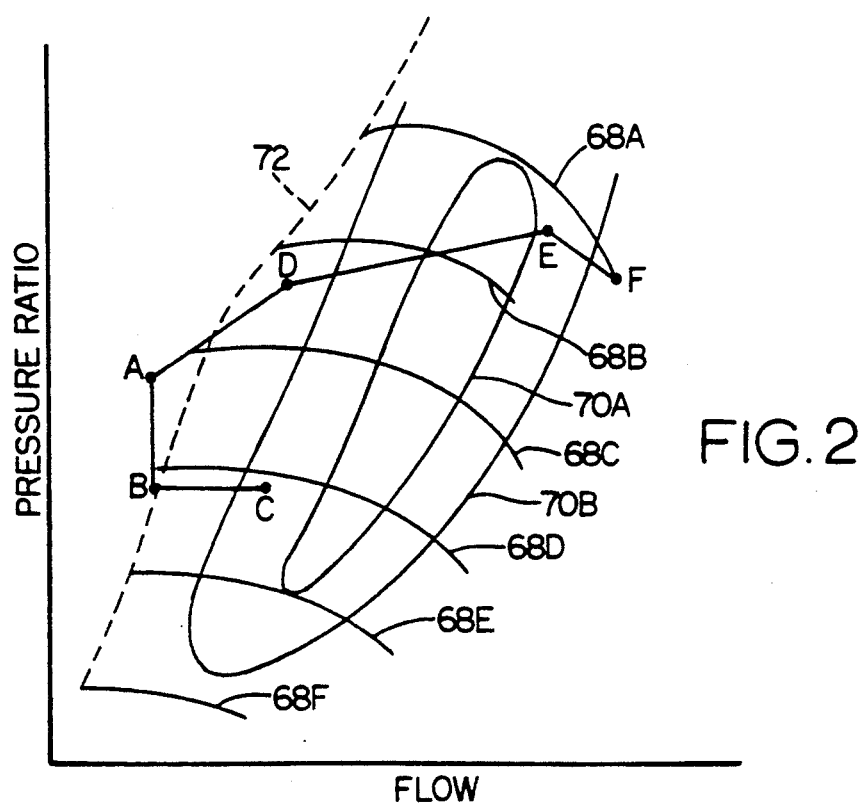
FIG. 2 is a compressor map of the turbocharger system illustrated in FIG. 1.

Referring now to the compressor map illustrated in FIG. 2, system pressure ratio is plotted on the ordinate or vertical axis of the map and flow through the turbocharging system is plotted on the abscissa or horizontal axis. Lines 68A–68F are constant speed lines, the lines 70A, 70B connect points of common compressor efficiency The surge line is indicated at 72. The main compressor cannot be operated in the region to the left of the surge line without causing instabilities and possible destruction of the main turbocharger. However, the desired operation of the turbocharger, in order to provide sufficient charge air to the intake manifold of the engine, must follow the lines A-D-E-F in FIG. 2. The pressure ratio demanded at point A, at which the main turbocharger is turning at a relatively low speed and low flow condition due to a low exhaust gas flow, is well into the surge area to the left of the surge line 72. By use of the invention, the main compressor 22 is operated at point C, which is in a stable region of the compressor map and at relatively high efficiency. Accordingly, the amount of compressed air recirculated through the turbine section 36 of the auxiliary turbocharger 37 and discharged to atmosphere is represented by line C-B in FIG. 2, and the pressure increase effected by the compressor section 62 of the auxiliary turbocharger 37 on the remaining output of compressor portion 26 of main turbocharger 22 is indicated by B-A. Accordingly, by use of the invention, the main turbocharger can be run in a stable region at high efficiency, while providing the necessary pressure increase in order to supply charge air at a sufficient pressure level to assure maximum efficiency from the engine 10 at all engine speeds. Also, by supplying charge air at a sufficient pressure to the intake manifold 12 minimizes particulate emissions from engine 10 at low engine speeds.

Figure 3:
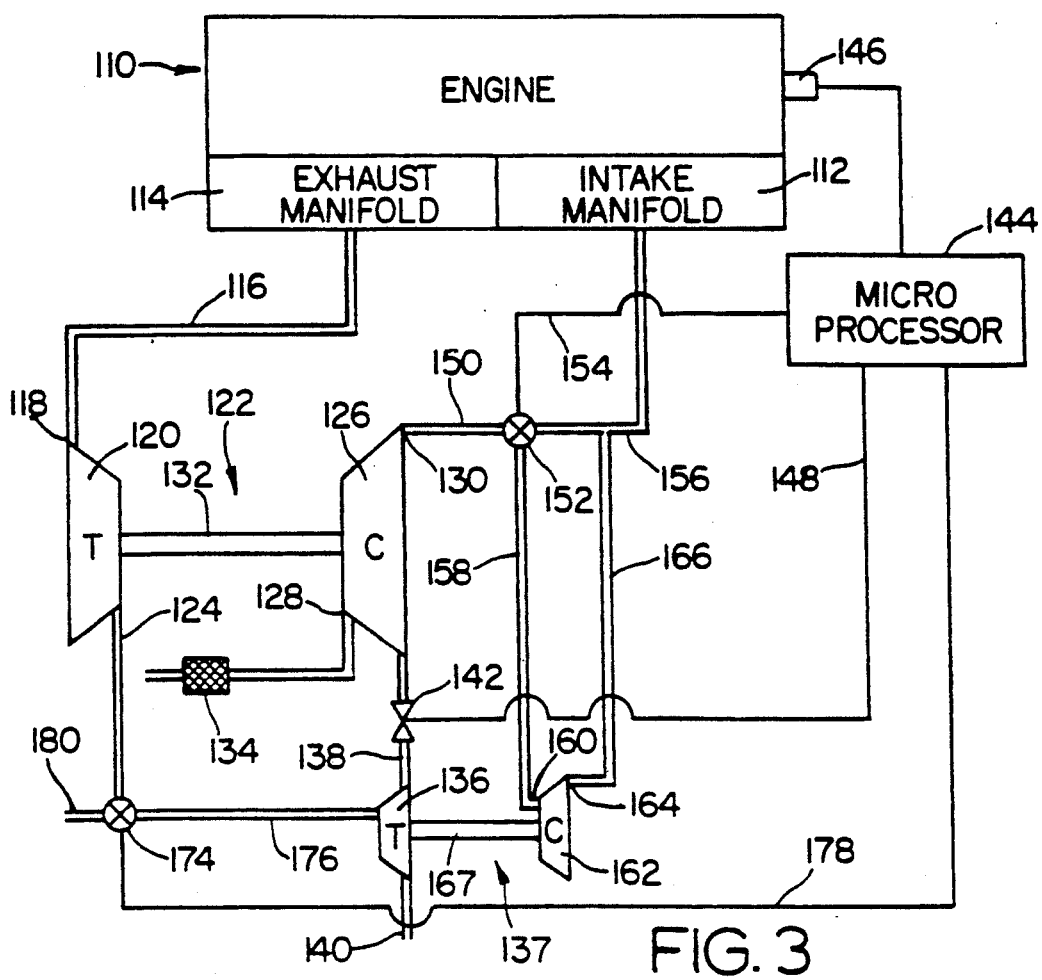
FIG. 3 is a line diagram similar to FIG. 1, but illustrating an alternate embodiment of the invention.

Referring now to the alternate embodiment of FIG. 3, elements substantially the same as those in the preferred embodiment of FIG. 1 retain the same reference character, but increased by 100. The only difference between the embodiment of FIG. 3 and the embodiment of FIG. 1 is the provision of a third electrically actuated control valve 174 in the exhaust line 124 which controls communication into a branch 176 which communicates the exhaust line 124 with turbine section 134 of auxiliary compressor 136. At low engine speed operation, the system of FIG. 3 operates in exactly the same manner as the system illustrated in FIG. 1. However, at high speed operation, the microprocessor 144 signals the valve 174 through line 178 to direct exhaust gas from the discharge branch 180 of exhaust line 124 into the branch 176 to the turbine section 136 of auxiliary turbocharger 137. At the same time, the valve 152 is signaled to direct the output of compressor section 126 of main turbocharger 122 into the branch 158 to the compressor section 162 of the auxiliary turbocharger 136. Accordingly, at high speed operation, the auxiliary turbocharger 137 acts as a sequential turbocharger in which some of the remaining energy in the exhaust gasses after been passed through the turbine portion 120 of the main turbocharger 122 is used to power the turbine 136 of the auxiliary turbocharger 137. Accordingly, at high engine speeds, the auxiliary turbocharger 137 is operated by exhaust gas and at low engine speeds the auxiliary turbocharger 137 is operated by a portion of the compressed air generated by compressor portion 126 of main turbocharger 122. Using this sequential mode of operation permits reduction of the size of the main turbocharger, thus reducing its polar moment of inertia and improving its acceleration response at low speeds. The disadvantage of using the auxiliary turbocharger 137 as both a low flow and a high air flow device is the additional valve 174 and associated controls. Also, if the auxiliary turbocharger 137 is powered only by the relatively low temperature compressed air generated by compressor portion 126, the entire auxiliary turbocharger 137 can be made of inexpensive, light weight, low temperature materials. However, if the auxiliary turbocharger 137 is to be powered by both compressed air and exhaust gases, the turbine section 136 must be made out of relatively more expensive, high temperature materials.

Figure 4:
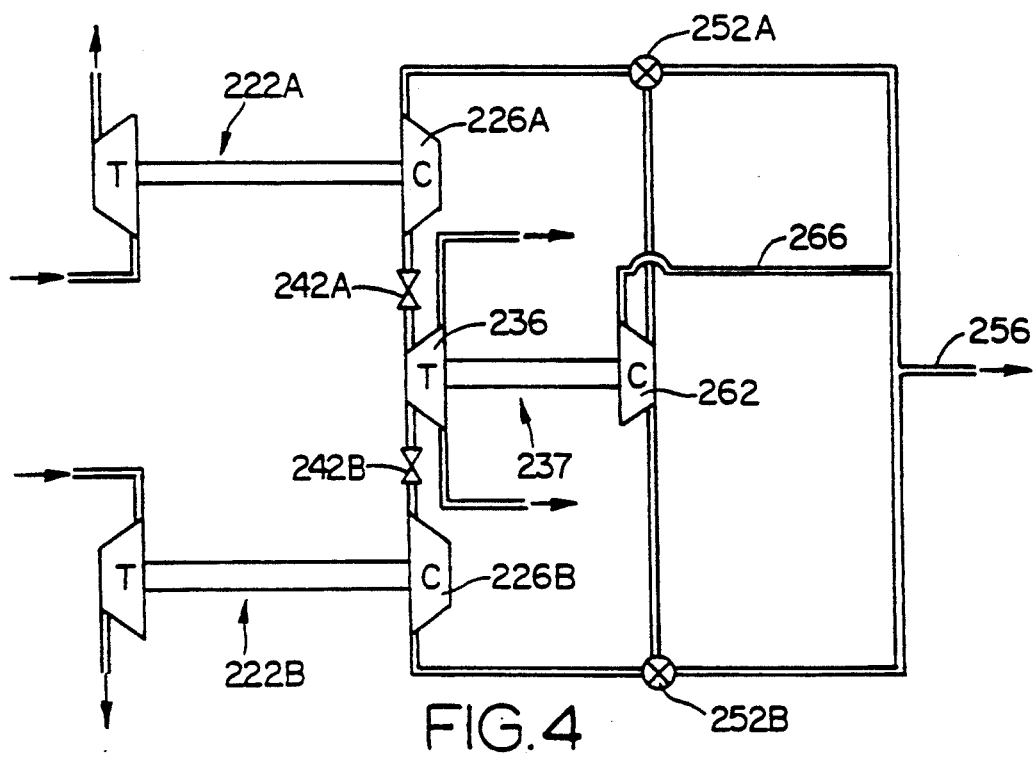
FIG. 4 is a line diagram similar to FIGS. 1 and 3 but illustrating still another embodiment of the invention.

Referring to the embodiment of FIG. 4, elements substantially the same as those in the preferred embodiment retain the same reference character, but increased by 200. In FIG. 4, the main turbocharger 22 in the embodiment of FIG. 1 is replaced by two turbochargers 222A, 222B in parallel. At low speed operation, a portion of the output of the corresponding compressor portions 226A, 226B is controlled by modulating valves 242A, 242B and communicated to the turbine section 236 of auxiliary compressor 237. The remainder of the compressed air generated by compressor portions 226A and 226B is controlled by two-way valves 252A, 252B so that under such low speed operation the remainder of the compressed air output of the compressors 226A, 226B other than that recirculated through the turbine 236 is communicated to the compressor 262. The compressor 262 of auxiliary turbocharger 237 further increases the pressure level of the compressed air generated by the main turbochargers 222A and 222B, and transfers the compressed air to the intake manifold of the engine on which the turbocharger system is used through discharge lines 266 and 256. During high speed operation, the two-way valves 252A, 252B are switched into positions in which the output of both the compressors 226A and 226B is transferred directly to the passage 256 and to the intake manifold of the engine, thereby bypassing the auxiliary turbocharger 237. Accordingly, the auxiliary turbocharger 237 improves low speed stability of the turbocharger system and also permits higher pressure levels to be generated without surge, in the same way as the embodiment of FIG. 1 with a single turbocharger system.

I claim:

1. Method of providing charge air to the intake manifold of an internal combustion engine, comprising the steps of using exhaust gasses produced by said engine to operate a main turbocharger to compress air passed through the main turbocharger to generate compressed air, determining when a low exhaust gas flow condition of said engine exists, and using a portion of the compressed air generated by said main turbocharger during said low exhaust gas flow condition to power an auxiliary turbocharger, and using said auxiliary turbocharger to boost the pressure of the charge air delivered to said intake manifold under such low exhaust gas flow conditions.

2. Method of providing charge air as claimed in claim 1, wherein the air passed through the main turbocharger under such low exhaust gas flow conditions other than the portion used to power the auxiliary turbocharger is compressed by said auxiliary turbocharger and then communicated to said intake manifold.

3. Method of providing charge air as claimed in claim 1, wherein said auxiliary turbocharger includes a turbine section and a compressor section operated by said turbine section, and said method includes the steps of dividing the air passing through the main turbocharger under such low exhaust gas flow conditions into a first portion and a second portion, communicating said first portion to said turbine section, discharging said first portion to atmosphere after it is passed through said turbine section, and communicating said second portion to said intake manifold.

4. Method of providing charge air as claimed in claim 3, wherein said method includes the steps of passing said second portion through said compressor section, using said compressor section to increase the pressure level of said second portion, and then communicating said second portion to said intake manifold after said second portion is passed through said compressor section.

5. Method of providing charge air as claimed in claim 3, wherein said main turbocharger includes a main turbocharger compressor having an inlet for receiving air and a discharge for discharging compressed air, said method including the steps of dividing the compressed air at said discharge into said first and second portions.

6. Method of providing charge air as claimed in claim 5, wherein said method includes the step of opening a normally closed modulating valve controlling communication between said discharge and said turbine section when a low exhaust gas flow condition is determined to exist.

7. Method of providing charge air as claimed in claim 5, wherein said method includes the step of moving a two way control valve controlling communication between said discharge, said intake manifold, and said compressor section from a normal position communicating said discharge with the inlet manifold and closing off said compressor section to a second condition closing off said intake manifold and communicating the discharge to the compressor section when a low exhaust gas flow condition is determined to exist.

8. Method of providing charge air as claimed in claim 1, wherein said method includes the steps of opening a normally closed modulating valve controlling communication of compressed air between said main turbocharger and a turbine section of said auxiliary turbocharger when a low exhaust gas flow condition is determined to exist.

9. Method of providing charge air as claimed in claim 8, wherein said method includes the step of discharging the compressed air communicated to said turbine section to atmosphere after said compressed air passes through the turbine section of the auxiliary compressor.

10. Method of providing charge air as claimed in claim 1, wherein said low exhaust gas flow condition is determined by establishing that the speed of said engine has dropped below a predetermined level.

11. Method of providing charge air as claimed in claim 1, wherein said main turbocharger comprises a pair of turbocharging devices each of which uses exhaust gasses from said engine to generate compressed air, and said method includes the steps of using at least a portion of the compressed air of at least one of said turbocharging devices to power an auxiliary turbocharger, and using the auxiliary turbocharger to boost the pressure level of the compressed air delivered to the inlet manifold.

12. Method of providing charge air as claimed in claim 11, wherein said auxiliary turbocharger includes a turbine section using said portion to operate a compressor section, said method including the step of communicating the remainder of the compressed air generated by both of the turbocharger devices to the compressor section of the auxiliary turbocharger.

13. Turbocharging system for supplying charge air to the intake manifold of an internal combustion engine comprising a main turbocharger having a turbine portion responsive to exhaust gasses generated by said engine for operating a compressor portion for compressing air for providing charge air to the intake manifold of said engine, and an auxiliary turbocharger operated by a portion of the compressed air generated by the compressor portion of the main turbocharger for boosting the pressure of the charge air in the intake manifold, and control means responsive to predetermined engine operating conditions for controlling communication of said portion of the compressed air to the auxiliary turbocharger.

14. Turbocharging system as claimed in claim 13, wherein said auxiliary turbocharger includes a compressor section, said control means including first communicating means for communicating the remainder of the compressed air generated by the compressor portion to the compressor section of the auxiliary turbocharger during predetermined engine operating conditions for boosting the pressure level of said compressed air, and second communicating means for communicating the output of the compressor section to the intake manifold.

15. Turbocharging system as claimed in claim 13, wherein said control means includes means for sensing a low exhaust gas flow condition and valve means responsive to said low exhaust gas flow condition for bypassing said auxiliary turbocharger when said low exhaust gas flow condition does not exist and for communicating the compressor section with the compressor portion of the main turbocharger when the low exhaust gas flow condition does exist.

16. Turbocharging system as claimed in claim 13, wherein said control means includes means for sensing engine speed, and valve means responsive to engine speed above a predetermined level for bypassing said auxiliary turbocharger and for sensing a decrease in engine speed below the predetermined level for communicating the compressor section with the compressor portion of the main turbocharger when the low exhaust gas flow condition does exist.

17. Turbocharging system as claimed in claim 14, wherein said auxiliary turbocharger includes a turbine section for operating said compressor section, said first communicating means including first valve means controlling communication of said portion of the compressed air generated by the compressor portion of the main turbocharger to the turbine section of the auxiliary compressor, said control means being responsive to said predetermined engine operating conditions for controlling said first valve means.

18. Turbocharging system as claimed in claim 14, wherein said auxiliary turbocharger includes a turbine section for operating said compressor section, said first communicating means including first valve means controlling communication of said portion of the compressed air generated by the compressor portion of the main turbocharger to the turbine section of the auxiliary compressor, and third communicating means for communicating exhaust gasses to said turbine section of said auxiliary turbocharger, said third communicating means including third valve means for controlling communication of exhaust gasses to said turbine section, said control means opening said third valve means under predecided engine operating conditions but only when the first valve means is closed.

19. Turbocharging system as claimed in claim 14, wherein said auxiliary turbocharger includes a turbine section for operating said compressor section, and means responsive to said control means for communicating engine exhaust gas to said turbine section under predetermined engine operating conditions.

* * * * *